United States Patent
da Silva et al.

(10) Patent No.: US 7,080,437 B2
(45) Date of Patent: Jul. 25, 2006

(54) METHOD OF MANUFACTURING AN AXIALLY COLLAPSIBLE DRIVESHAFT ASSEMBLY

(75) Inventors: Jose da Silva, Toledo, OH (US); Daniel W. Gibson, Maumee, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 0 days.

(21) Appl. No.: 10/407,868

(22) Filed: Apr. 4, 2003

(65) Prior Publication Data

US 2003/0213117 A1    Nov. 20, 2003

Related U.S. Application Data

(60) Provisional application No. 60/370,066, filed on Apr. 4, 2002.

(51) Int. Cl.
*B23P 17/00* (2006.01)
(52) U.S. Cl. .................. 29/421.1; 29/425; 29/469.5; 29/527.1; 29/897.2; 72/56; 72/58
(58) Field of Classification Search ............. 29/421.1, 29/425, 469.5, 521, 522.1, 523, 527.1, 527.6, 29/897.2; 72/56, 58, 59, 370.22; 464/162, 464/175
See application file for complete search history.

(56) References Cited

U.S. PATENT DOCUMENTS

| | | | |
|---|---|---|---|
| 1,378,442 A | | 5/1921 | Chalfant |
| 3,088,761 A | * | 5/1963 | Myers ...................... 403/284 |
| 3,685,327 A | | 8/1972 | Nakamura |
| 3,698,259 A | * | 10/1972 | Reeves ...................... 74/492 |
| 4,751,835 A | | 6/1988 | Galaniuk et al. |
| 5,243,874 A | | 9/1993 | Wolfe et al. |
| 5,983,497 A | | 11/1999 | Breese et al. |
| 6,015,350 A | * | 1/2000 | Breese ...................... 464/162 |
| 6,138,358 A | * | 10/2000 | Marando ................... 29/897.2 |
| 6,193,612 B1 | | 2/2001 | Craig et al. |
| 6,368,225 B1 | * | 4/2002 | Breese et al. .............. 464/183 |
| 6,484,384 B1 | * | 11/2002 | Gibson et al. ................ 29/516 |
| 6,497,030 B1 | * | 12/2002 | Marando .................. 29/421.1 |
| 6,519,855 B1 | * | 2/2003 | Marando ................... 29/897.2 |
| 6,543,266 B1 | * | 4/2003 | Jaekel ......................... 72/61 |
| 6,666,772 B1 | * | 12/2003 | Cheney et al. .............. 464/183 |
| 6,698,076 B1 | * | 3/2004 | Brissette et al. ........... 29/897.2 |
| 6,754,943 B1 | * | 6/2004 | Perry et al. ................ 29/421.1 |
| 6,978,545 B1 | * | 12/2005 | Marando ................... 29/897.2 |
| 7,007,362 B1 | * | 3/2006 | Gibson ..................... 29/419.2 |
| 2003/0005737 A1 | * | 1/2003 | Gharib ........................ 72/58 |
| 2006/0005393 A1 | * | 1/2006 | Wagner et al. ............. 29/897.2 |

FOREIGN PATENT DOCUMENTS

EP    1350970 A2 * 10/2003
GB    2371614 A  *  7/2002

* cited by examiner

*Primary Examiner*—Essama Omgba
(74) *Attorney, Agent, or Firm*—MacMillan, Sobanski & Todd, LLC

(57) ABSTRACT

To manufacture an axially collapsible driveshaft assembly, first and second tubular members are disposed in an axially overlapping relationship. Central portions of the concentric tubular members are then deformed into conformance with a die cavity having a non-circular cross sectional shape. The deformed first and second tubular members are then cut to provide two pairs of outer and inner tubular sections. Next, the outer tubular sections are removed from the associated inner tubular sections, and the inner tubular sections are oriented such that the deformed portions thereof are aligned with the deformed portions of the outer tubular sections. Lastly, the deformed portions of the inner tubular sections are inserted within the deformed portions of the outer tubular sections to form a pair of axially collapsible driveshaft assemblies.

19 Claims, 7 Drawing Sheets

METHOD OF MANUFACTURING AN AXIALLY COLLAPSIBLE DRIVESHAFT ASSEMBLY

CROSS REFERENCE TO RELATED APPLICATION

This application claims the benefit of U.S. Provisional Application No. 60/370,066, filed Apr. 4, 2002, the disclosure of which is incorporated herein by reference.

BACKGROUND OF THE INVENTION

This invention relates in general to drive train systems for transferring rotational power from a source of rotational power to a rotatably driven mechanism. In particular, this invention relates to an improved method of manufacturing an axially adjustable driveshaft assembly for use in such a drive train system.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible so as to absorb energy during a collision. To accomplish this, the driveshaft tube may be formed as an assembly of first and second driveshaft sections that are connected together for concurrent rotational movement during normal operation, yet are capable of moving axially relative to one another when a relatively large axially compressive force is applied thereto, such as can occur during a collision. A variety of such axially collapsible driveshaft assemblies are known in the art. However, known methods of manufacturing such first and second driveshaft sections having been found to be relatively difficult, time consuming, expensive. Thus, it would be desirable to provide an improved method of manufacturing an axially collapsible driveshaft assembly for use in a drive train system that is relatively simple, quick, and inexpensive to perform.

SUMMARY OF THE INVENTION

This invention relates to an improved method of manufacturing an axially collapsible driveshaft assembly, such as for use in a vehicular drive train system, that is relatively simple, quick, and inexpensive to perform. Initially, a first hollow tubular members is disposed in an axially overlapping relationship within a second hollow tubular member. The first and second tubular members are then disposed within a forming die having a die cavity that defines a non-circular cross-sectional shape. The central portions of the concentric tubular members are then expanded outwardly into conformance with the die cavity, such as by mechanical deformation, electromagnetic pulse forming, hydroforming, and the like. As a result of this expansion, the central portion of the outer second tubular member is deformed to have the same non-circular cross sectional shape as the die cavity, while the inner first tubular member is deformed to have the same non-circular cross sectional shape as the deformed outer first tubular member. The deformed first and second tubular members are then cut to provide two pairs of outer and inner tubular sections. Next, the outer tubular sections are removed from the associated inner tubular sections, and the inner tubular sections are oriented such that the deformed portions thereof are aligned with the deformed portions of the outer tubular sections. Lastly, the deformed portions of the inner tubular sections are inserted within the deformed portions of the outer tubular sections to form a pair of axially collapsible driveshaft assemblies.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
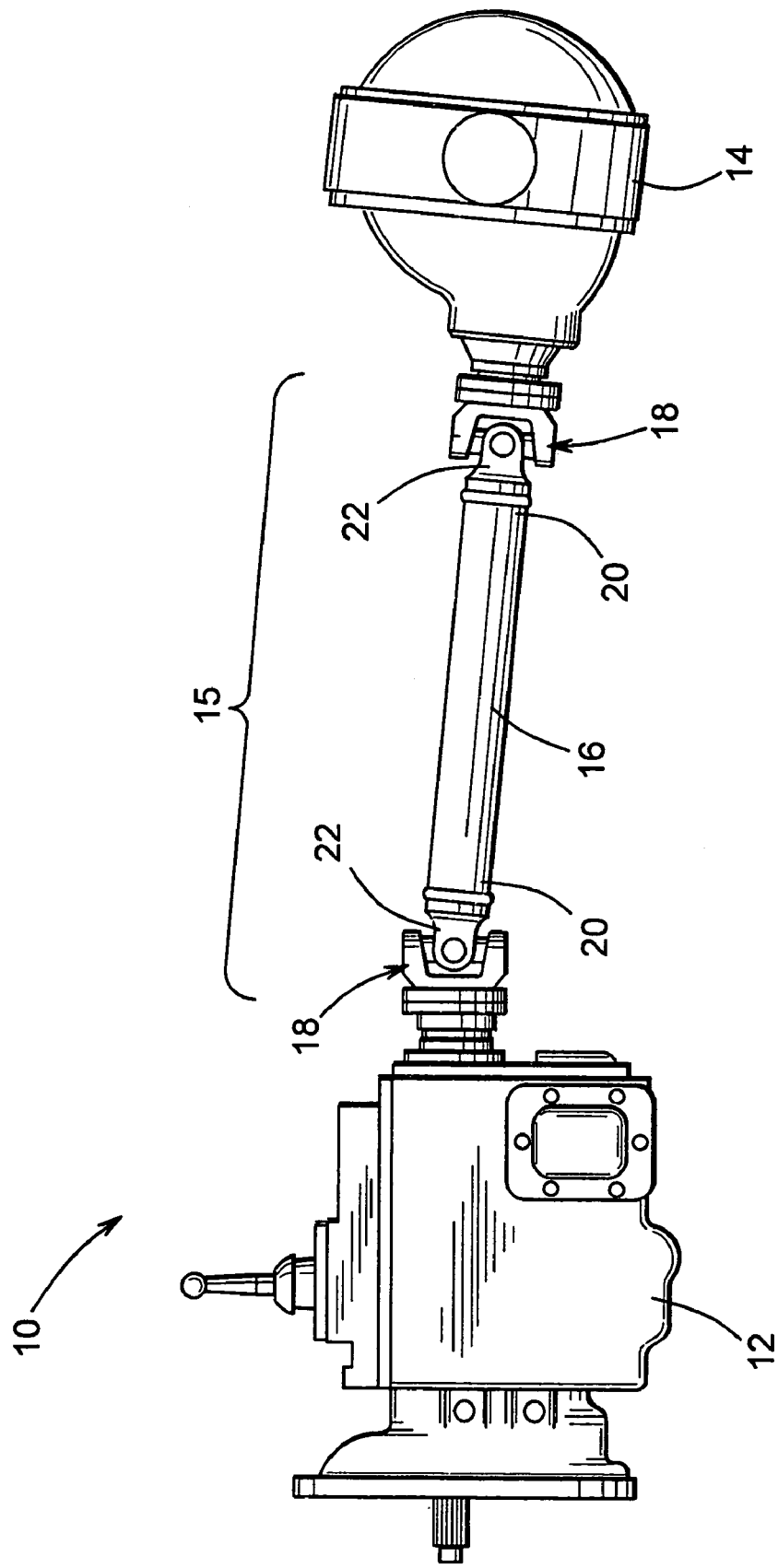
FIG. 1 is a side elevational view of a conventional vehicle drive train system including a driveshaft assembly that can be manufactured in accordance with the method of this invention.

Referring now to the drawings, there is illustrated in FIG. 1 a vehicle drive train system, indicated generally at 10, that is conventional in the art. The illustrated drive train system 10 is intended merely to illustrate one environment in which this invention may be used. Thus, the scope of this invention is not intended to be limited for use with the specific structure for the vehicle drive train system 10 illustrated in FIG. 1 or with vehicle drive train systems in general. On the contrary, as will become apparent below, this invention may be used in any desired environment for the purposes described below.

The illustrated vehicle drive train system 10 includes a transmission 12 that is connected to an axle assembly 14 through a driveshaft assembly 15. The driveshaft assembly 15 includes an elongated, cylindrically-shaped driveshaft tube 16. As is typical in conventional vehicle drive train systems 10, the output shaft (not shown) of the transmission 12 and the input shaft (not shown) of the axle assembly 14 are not coaxially aligned. Therefore, universal joints, indicated generally at 18, are provided at each end 20 of the driveshaft tube 16 to rotatably connect the driveshaft tube 16 at an angle relative to the output shaft of the transmission 12 and at an angle relative to the input shaft of the axle assembly 14.

The connections between the ends 20 of the driveshaft tube 16 and the universal joints 18 are usually accomplished by a pair of end fittings 22, such as the illustrated tube yokes. The ends 20 of the driveshaft tube 16 are open and are adapted to receive portions of the end fittings 22 therein. Typically, each end fitting 22 includes a tube seat (not shown) that is inserted into an open end 20 of the driveshaft tube 16. The end fittings 22 can be secured to the driveshaft tube 16 by welding, adhesives, or similar relatively permanent attachment methods. Accordingly, torque can be transmitted from the transmission 12 through the first end fitting 22, the driveshaft tube 16, and the second end fitting 22 to the axle assembly 14.

Figure 2:
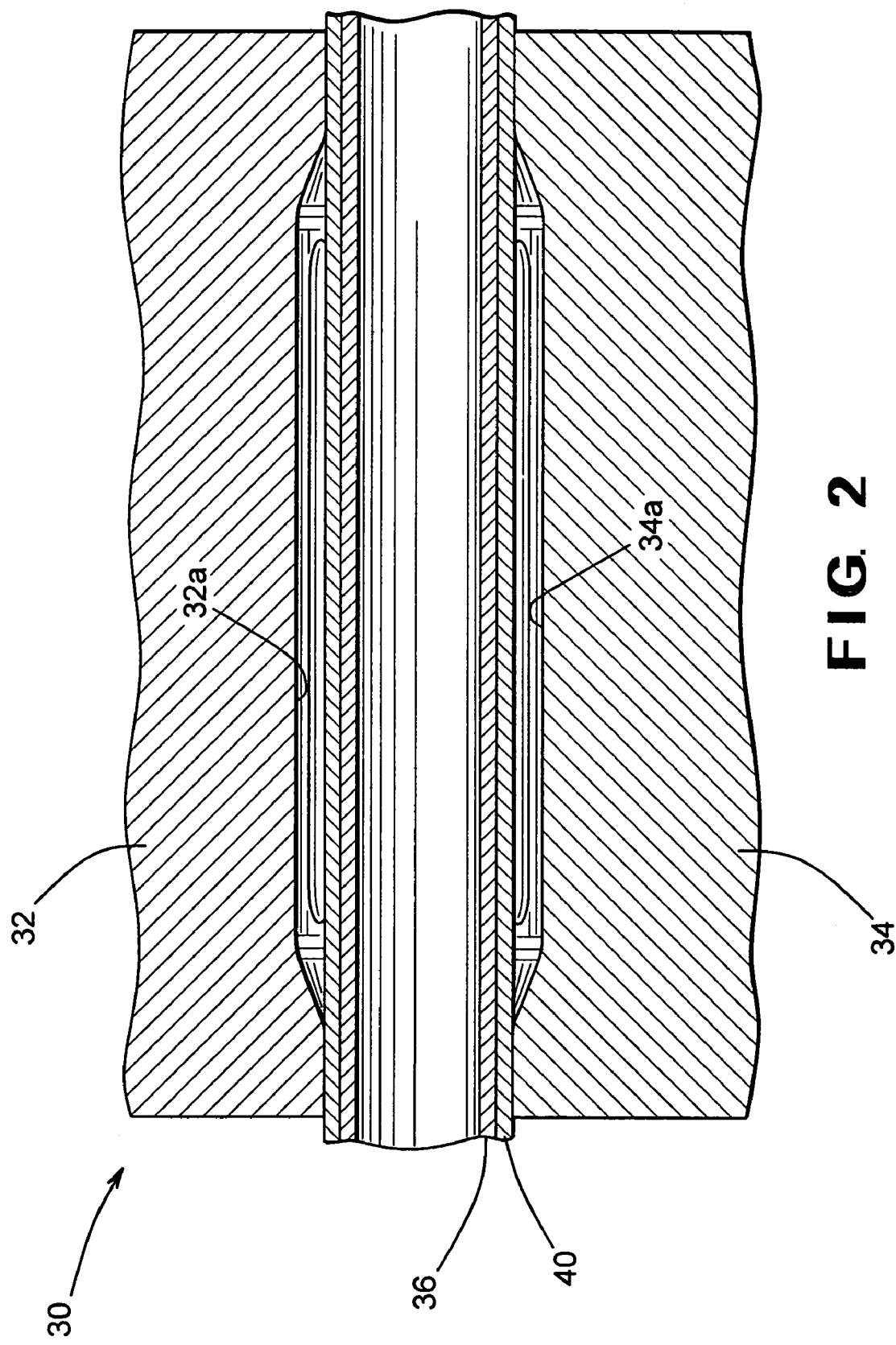
FIG. 2 is a sectional elevational view of a portion of a forming die having first and second hollow tubular members disposed therein, shown prior to deformation.
Figure 3:
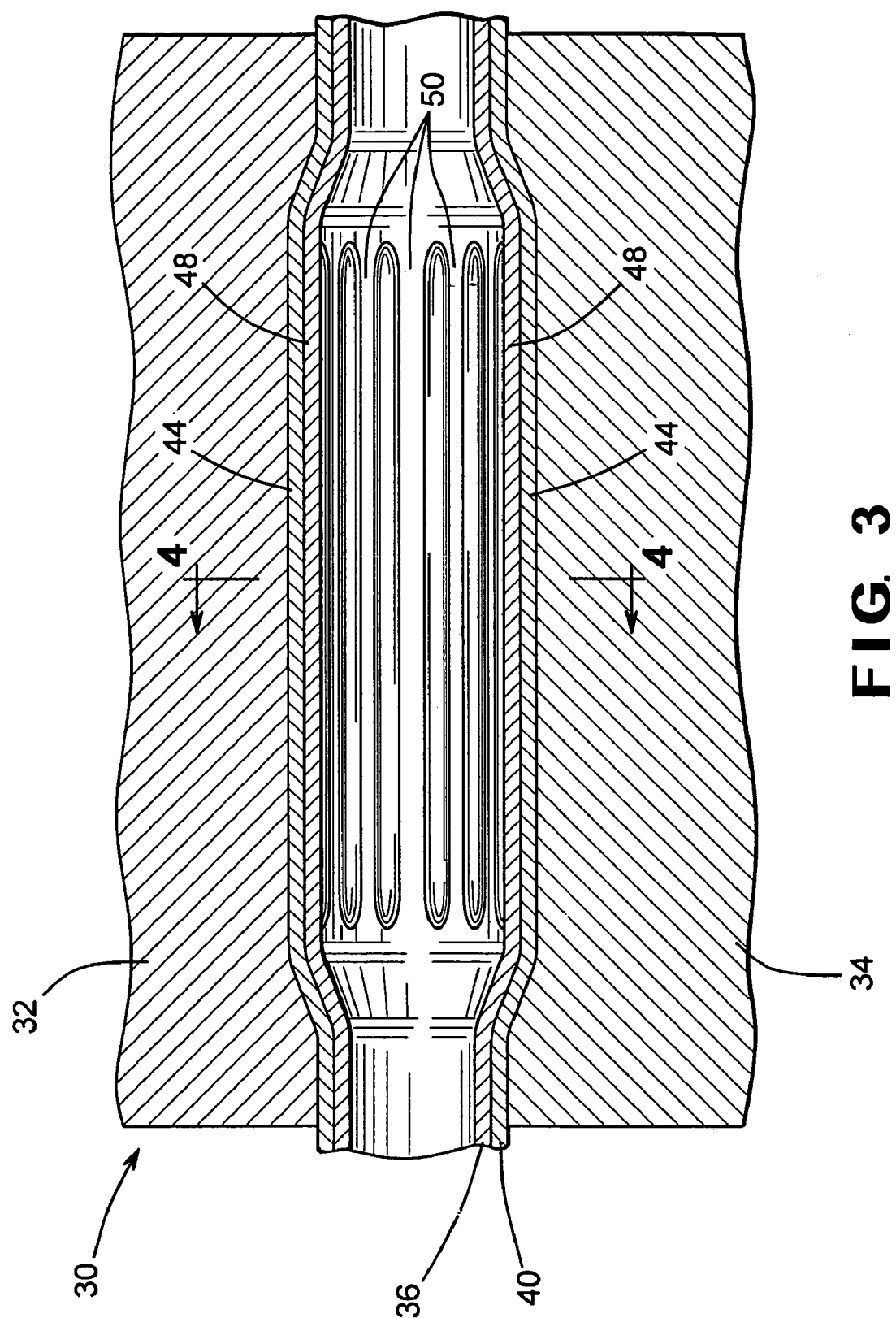
FIG. 3 is a sectional elevational view similar to FIG. 2 showing the first and second hollow tubular members after deformation.
Figure 4:
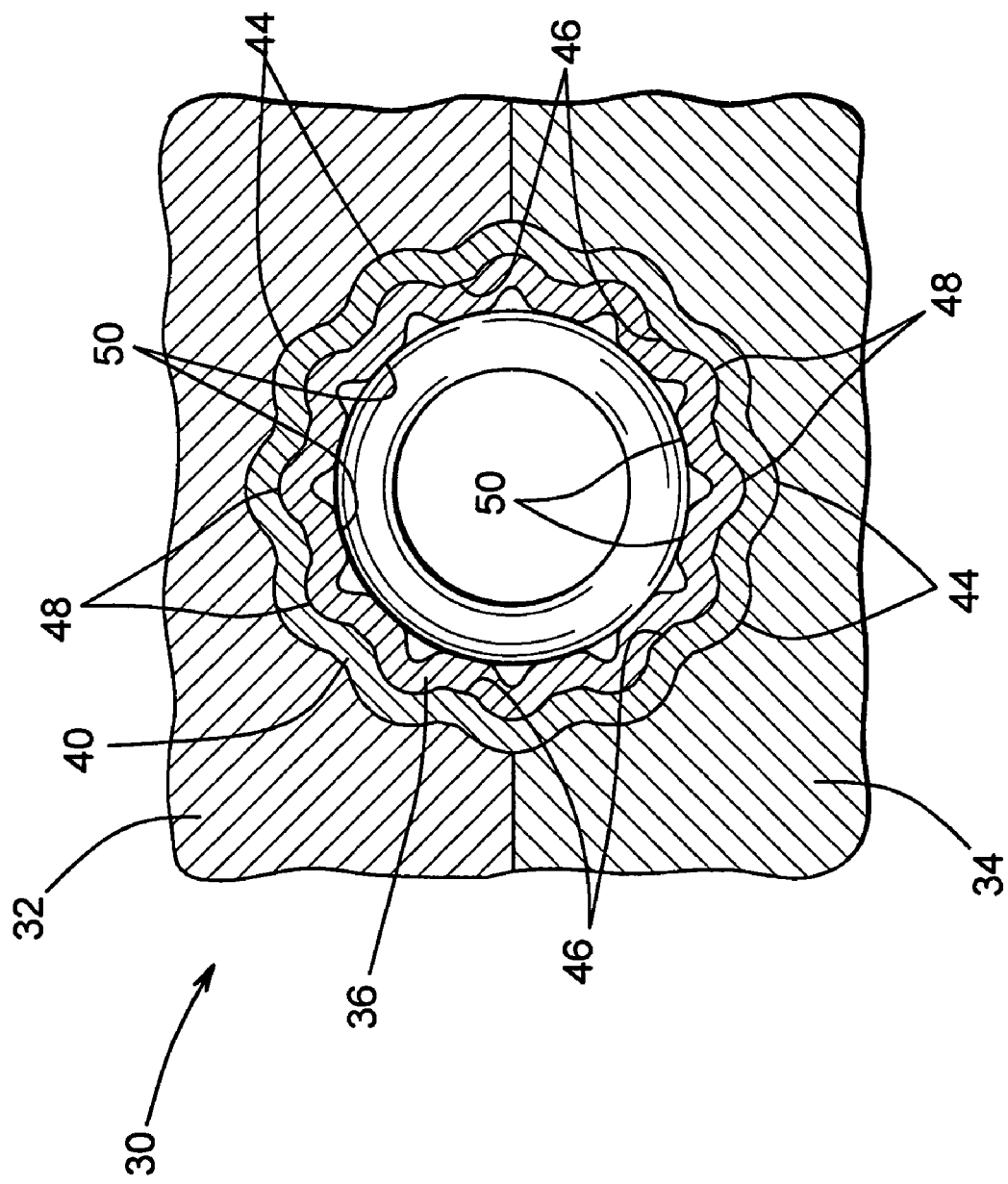
FIG. 4 is a cross sectional view taken along line 4—4 of FIG. 3.

FIGS. 2 through 7 illustrate an improved method of manufacturing an axially collapsible driveshaft assembly that can be used, for example, in lieu of the conventional driveshaft tube 16 of the vehicular drive train system 10 illustrated in FIG. 1. Initially, as shown in FIG. 2, a forming die, indicated generally at 30, is provided. The forming die 30 includes a pair of opposed die sections 32 and 34 that are supported for relative movement between opened and closed positions. The die sections 32 and 34 have cooperating recesses 32a and 34a formed therein that together define an internal die cavity having a desired shape. When moved to the opened position (not shown), the die sections 32 and 34 are spaced apart from one another to allow a workpiece to be inserted within or removed from the die cavity. When moved to the closed position illustrated in FIG. 2, the die sections 32 and 34 are disposed adjacent to one another so as to enclose the workpiece within the die cavity. Preferably, the die cavity of the forming die 30 has a cross sectional shape that is generally circular, but having a circumference that is gently undulating or sinusoidal, as best shown in FIG. 4. However, the die cavity may be formed having any desired cross sectional shape (preferably non-circular, as will become apparent below).

To begin the manufacturing process, first and second hollow tubular members, such as an inner tubular member 36 and an outer tubular member 40, are disposed in a concentric telescoping relationship, as shown in FIG. 2. The inner tubular member 36 and the outer tubular member 40 can be formed from any desired material or combination of materials. Typically, however, the inner tubular member 36 and the outer tubular member 40 are formed from steel or an aluminum alloy. Suitable methods for forming the inner tubular member 36 and the outer tubular member 40 are well known to persons skilled in the art. In the illustrated embodiment, the inner tubular member 36 and the outer tubular member 40 are both formed having a relatively constant outer diameter. However, if desired, either or both of the inner tubular member 36 and the outer tubular member 40 can be formed having a varying diameter or other cross sectional shape.

The die sections 32 and 34 are initially moved to the opened position so that the axially overlapping inner and outer tubular members 36 and 40 can be inserted therebetween. Then, the die sections 32 and 34 of the forming die 30 are moved to the closed position about the concentric tubular members 36 and 40, as shown in FIG. 2. Next, as shown in FIGS. 3 and 4, the inner tubular member 36 and the outer tubular member 40 are caused to be radially outwardly expanded. This expansion can be accomplished in any desired manner, such as by mechanical deformation, electromagnetic pulse forming, hydroforming, and the like. As a result of this expansion, a portion of the outer tubular member 40 (i.e., the central portion of the outer tubular member 40 that is disposed within the die cavity) is deformed outwardly into conformance with the shapes of the recesses 32a and 34a of the die sections 32 and 34, respectively. Thus, in the illustrated embodiment, this central portion of the outer tubular member 40 is deformed to have a circumferentially undulating cross sectional shape, including a plurality of radially outwardly extending regions 44 and a plurality of radially inwardly extending regions 46, as best shown in FIG. 4. Similarly, a portion of the inner tubular member 36 (i.e., the central portion of the inner tubular member 36 that is disposed within the outer tubular member 40 and within the die cavity) is deformed outwardly into conformance with the deformed inner surface (i.e., the plurality of radially outwardly extending regions 44 and the plurality of radially inwardly extending regions 46) of the outer tubular member 40. Thus, in the illustrated embodiment, this portion of the inner tube 36 is also deformed to have a circumferentially undulating cross sectional shape, including a plurality of radially outwardly extending regions 48 and a plurality of radially inwardly extending regions 50.

Accordingly, the plurality of radially outwardly extending regions 48 and the plurality of radially inwardly extending regions 50 of the inner tubular member 36 cooperate respectively with the plurality of radially outwardly extending regions 44 and the plurality of radially inwardly extending regions 46 of the outer tubular member 40 to function as a pair of splined members to provide a rotational driving connection between the inner tubular member 36 and the outer tubular member 40. As best shown in FIG. 4, the die cavity of the forming die 30 has a cross sectional shape that is generally circumferentially undulating. However, the die cavity of the forming die 30 may be formed having any desired (preferably non-circular) cross sectional shape. As further shown in FIG. 4, the generally circumferentially undulating cross sectional shape of the forming die 30 provides for twelve outwardly extending regions and twelve inwardly extending regions. However, the die cavity may be formed to provide for any suitable number of outwardly extending regions and inwardly extending regions.

Figure 5:
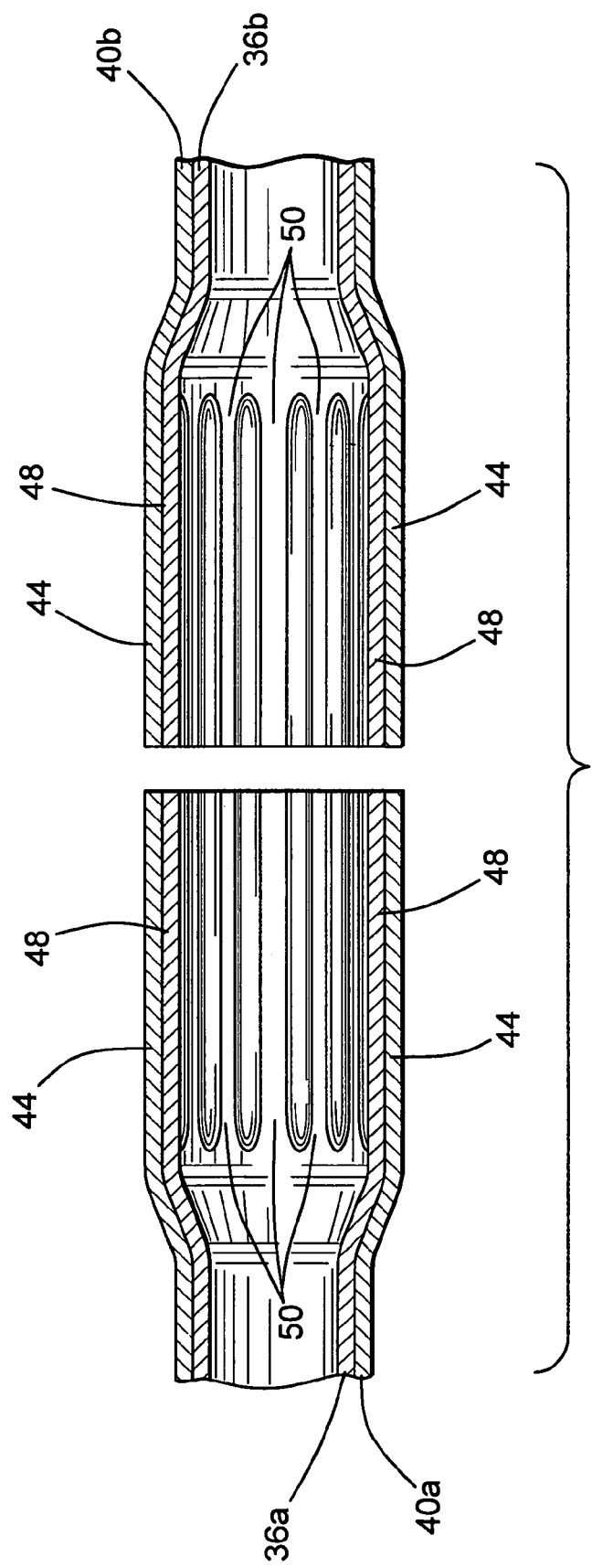
FIG. 5 is a sectional elevational view of the deformed tubular members illustrated in FIGS. 3 and 4 showing the first and second hollow tubular members after being divided into first and second pairs of tube sections.

Next, as shown in FIG. 5, the deformed inner and outer tubular members 36 and 40 are removed from the forming die 30, then divided into a first pair of tube sections including an first inner tube section 36a and a first outer tube section 40b and a second pair of tube sections including a second inner tube section 36b and a second outer tube section 40b. The inner and outer tubular members 36 and 40 may be divided in this manner using any suitable method, such as by mechanical or laser cutting. However, a variety of other methods are well known to persons skilled in the art. Preferably, the inner and outer tubular members 36 and 40 are cut at or near the center of the deformed portions thereof along a line that extends substantially perpendicular to the longitudinal axis thereof. Such a cut provides for two substantially identical pairs of tube sections 36a, 40a and 36b, 40b. Each of the inner tube sections 36a and 36b terminates in a deformed portion that includes the plurality of radially outwardly extending regions 48 and the plurality of radially inwardly extending regions 50 of the inner tubular member 36. Similarly, each of the outer tube sections 40a and 40b terminates in a deformed portion that includes the plurality of radially outwardly extending regions 44 and the plurality of radially inwardly extending regions 46 of the outer tubular member 40.

Figure 6:
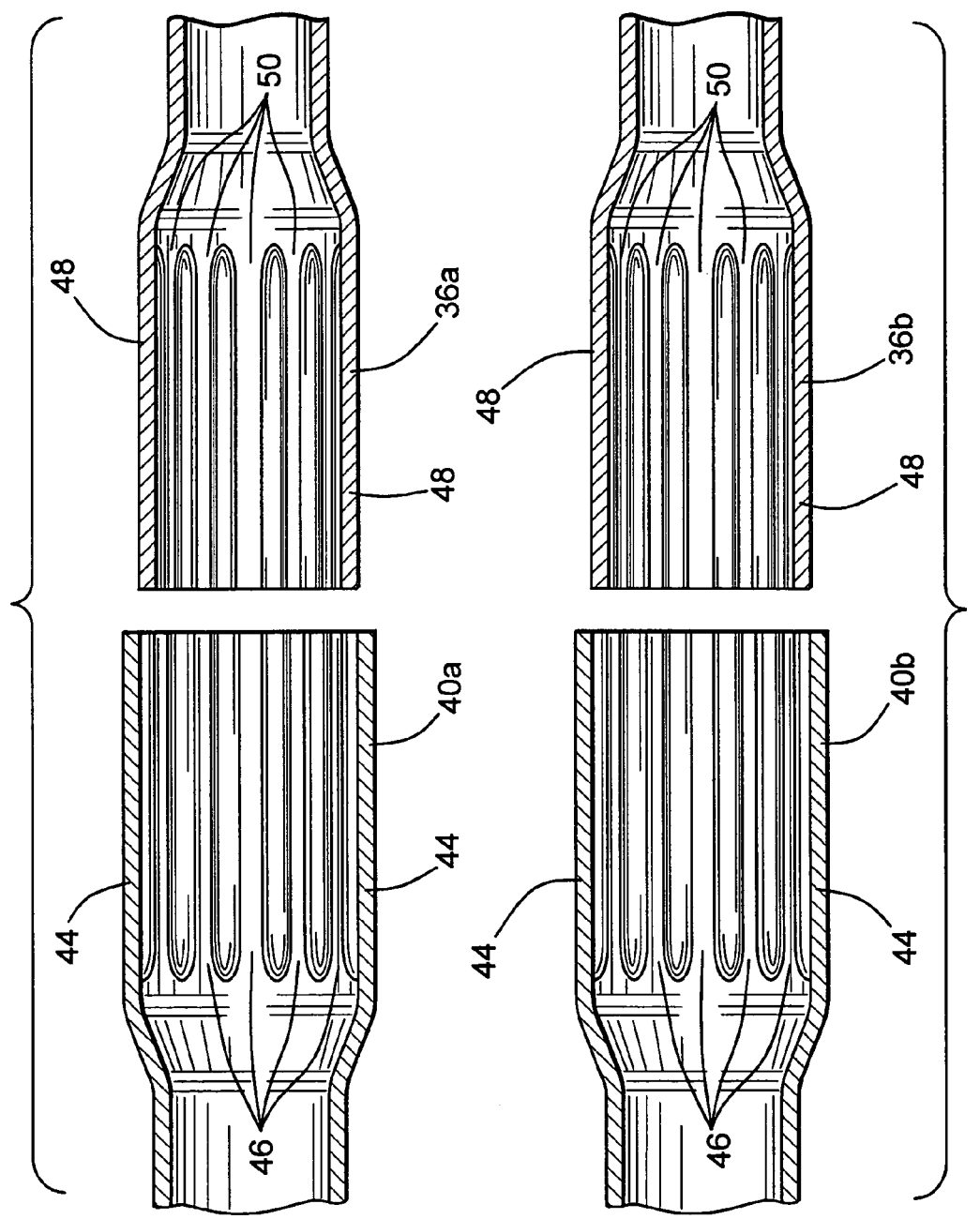
FIG. 6 is a sectional elevational view showing the first pair of tube sections illustrated in FIG. 5 after the outer tubular section has been removed from the associated inner tubular section, and the inner tubular section has been re-oriented and aligned for assembly with the outer tubular section.
Figure 7:
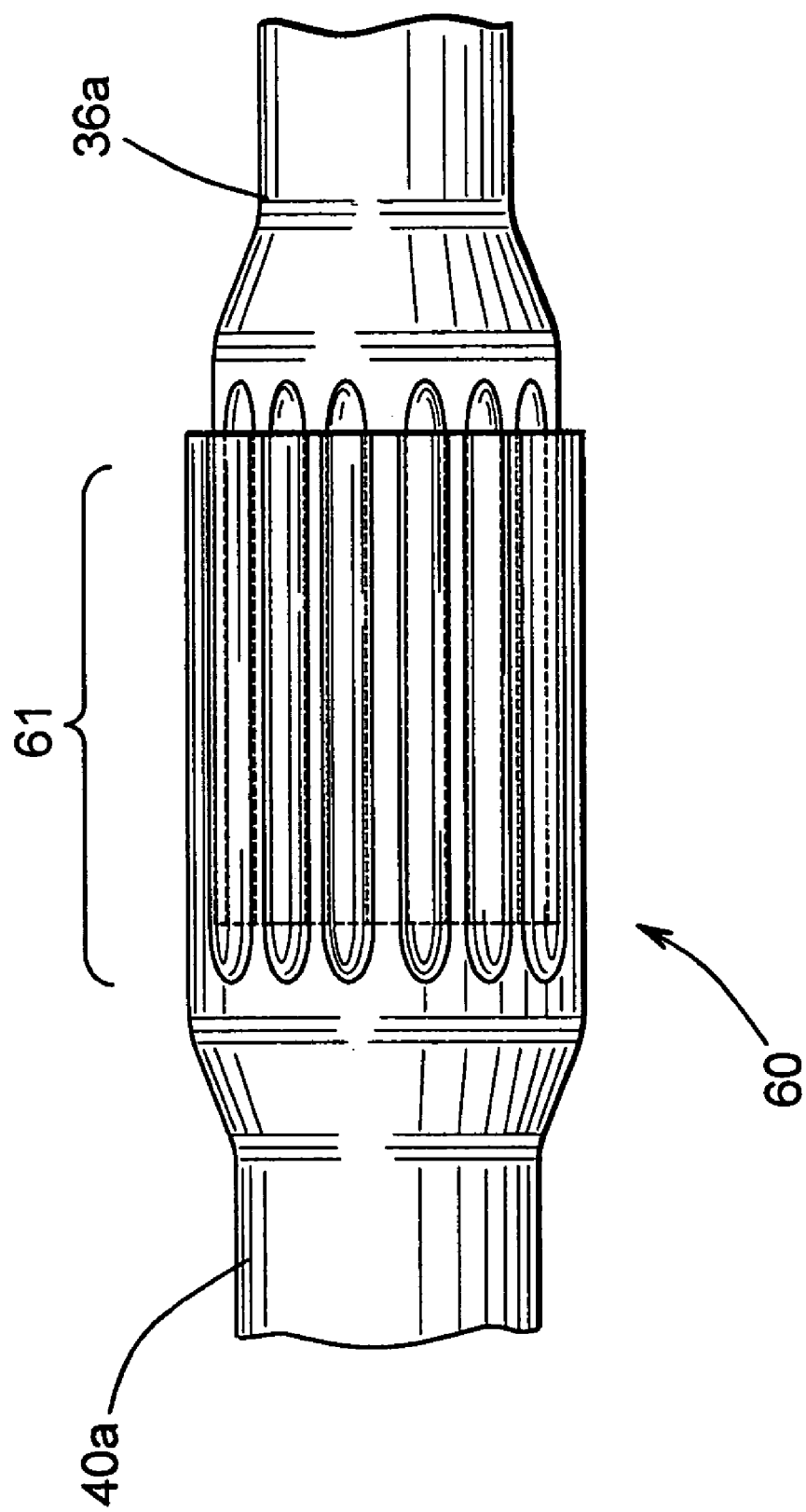
FIG. 7 is a sectional elevational view similar to FIG. 6 showing the outer tubular section assembled with the inner tubular section to form an axially collapsible driveshaft assembly.

As shown in FIG. 6, the outer tube sections 40a and 40b are then removed from the inner tube sections 36a and 36b, respectively, and re-oriented and aligned for assembly with one another as first and second driveshaft assemblies. To accomplish this, the first inner tube section 36a is initially removed from the first outer tube section 40a. Then, the first inner tube section 36a is re-oriented and aligned for assembly with the first outer tube section 40a, as shown in FIG. 6. Lastly, the first inner tube section 36a is inserted telescopically within the first outer tube section 40a, as shown in FIG. 7, to form a first driveshaft assembly, indicated generally at 60 in FIG. 7. When so inserted, the plurality of radially outwardly extending regions 48 and the plurality of radially inwardly extending regions 50 of the first inner tube section 36a cooperate respectively with the plurality of radially outwardly extending regions 44 and the plurality of radially inwardly extending regions 46 of the first outer tube section 40a to function as a pair of splined members to provide a rotational driving connection between the first inner tube section 36a and the first outer tube section 40a. Thus, the first driveshaft assembly 60 has a co-axially overlapping splined region 61 that can accommodate relative axial movement between the first inner tube section 36 and the first outer tube section 40, as described above. The second inner tube section 36b and the second outer tube section 40b can be manipulated in a similar manner to form a second driveshaft assembly (not shown).

As discussed above, the inner tubular member 36 and the outer tubular member 40 can be expanded at substantially the same time to achieve the desired shape within the forming die 30. However, it will be appreciated that such expansion of the two members need not be simultaneous, but rather can be performed separately. Furthermore, it will be appreciated that the method of this invention can be performed by collapsing the inner tubular member 36 and the outer 40 radially inwardly about a mandrel (not shown) that is disposed within the inner tubular member 36 and includes an outer surface having a desired (generally circumferentially undulating, for example) cross sectional shape.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a pair of cooperating members comprising the steps of:
   (a) providing first and second members;
   (b) orienting portions of the first and second members in a first axially overlapping relationship;
   (c) deforming regions of the axially overlapping portions of the first and second members;
   (d) removing the first and second members from the first axially overlapping relationship; and
   (e) re-orienting the deformed regions of the first and second members in a second axially overlapping relationship that is opposite to the first axially overlapping relationship to provide a pair of cooperating members.

2. The method defined in claim 1 wherein said step (a) is performed by providing first and second tubular members.

3. The method defined in claim 1 wherein said step (c) is performed by one of mechanical deformation, electromagnetic pulse forming, and hydroforming.

4. The method defined in claim 1 wherein said (c) is performed by deforming regions of the axially overlapping portions of the first and second members to have a non-circular cross sectional shape.

5. The method defined in claim 1 wherein said step (c) is performed by deforming regions of the axially overlapping portions of the first and second members to have a circumferentially undulating cross sectional shape.

6. The method defined in claim 1 wherein said step (d) is performed by initially dividing the first and second members into a first pair of sections and a second pair of sections, then removing the first pair of sections from the first axially overlapping relationship, and wherein said step (e) is performed by orienting the deformed regions of the first pair of sections in the second axially overlapping relationship to provide a first pair of cooperating members.

7. The method defined in claim 6 wherein said step (d) is further performed by removing the second pair of sections from the first axially overlapping relationship, and wherein said step (e) is performed by orienting the deformed regions of the second pair of sections in the second axially overlapping relationship to provide a second pair of cooperating members.

8. A method of manufacturing a pair of cooperating members comprising the steps of:
   (a) providing first and second members;
   (b) orienting portions of the first and second members in an axially overlapping relationship;
   (c) deforming regions of the axially overlapping portions of the first and second members;
   (d) dividing the first and second members at the deformed regions thereof to provide a first pair of sections and a second pair of sections;
   (e) removing the first pair of sections from the axially overlapping relationship; and
   (f) orienting the deformed regions of the first pair of sections in an axially overlapping relationship to provide a pair of cooperating members.

9. The method defined in claim 8 wherein said step (a) is performed by providing first and second tubular members.

10. The method defined in claim 8 wherein said step (c) is performed by one of mechanical deformation, electromagnetic pulse forming, and hydroforming.

11. The method defined in claim 8 wherein said (c) is performed by deforming regions of the axially overlapping portions of the first and second members to have a non-circular cross sectional shape.

12. The method defined in claim 8 wherein said step (c) is performed by deforming regions of the axially overlapping portions of the first and second members to have a circumferentially undulating cross sectional shape.

13. The method defined in claim 8 including the further steps of (g) removing the second pair of sections from the axially overlapping relationship; and (h) orienting the deformed regions of the second pair of sections in an axially overlapping relationship to provide a second pair of cooperating members.

14. A method of manufacturing a pair of cooperating members comprising the steps of:
(a) providing first and second members;
(b) orienting portions of the first and second members in an axially overlapping relationship;
(c) deforming regions of the axially overlapping portions of the first and second members;
(d) dividing the first and second members at the deformed regions thereof to provide a first pair of sections and a second pair of sections;
(e) removing the first pair of sections from the axially overlapping relationship, and removing the second pair of sections from the axially overlapping relationship; and
(f) orienting the deformed region of a first one of the first pair of sections and the deformed region of a first one of the second pair of sections in an axially overlapping relationship to provide a pair of cooperating members.

15. The method defined in claim 14 wherein said step (a) is performed by providing first and second tubular members.

16. The method defined in claim 14 wherein said step (c) is performed by one of mechanical deformation, electromagnetic pulse forming, and hydroforming.

17. The method defined in claim 14 wherein said (c) is performed by deforming regions of the axially overlapping portions of the first and second members to have a non-circular cross sectional shape.

18. The method defined in claim 14 wherein said step (c) is performed by deforming regions of the axially overlapping portions of the first and second members to have a circumferentially undulating cross sectional shape.

19. The method defined in claim 14 including the further step of (g) orienting the deformed region of a second one of the first pair of sections and the deformed region of a second one of the second pair of sections in an axially overlapping relationship to provide a second pair of cooperating members.

* * * * *